Patented May 10, 1932

1,857,274

UNITED STATES PATENT OFFICE

JOHN C. EMHARDT, OF NEWBURGH, NEW YORK, ASSIGNOR TO E. I. DU PONT DE NEMOURS & COMPANY, OF WILMINGTON, DELAWARE, A CORPORATION OF DELAWARE

PIGMENTED OIL COMPOSITION AND PROCESS OF INHIBITING OXIDATION THEREOF

No Drawing.     Application filed March 21, 1924. Serial No. 700,817.

This invention relates to compositions at least one constituent of which is an organic material, for instance, a liquid such as an unsaturated fatty oil, which has a tendency to undergo a chemical change at ordinary room temperature (20° C.) when exposed to air and to actinic light; of which another constituent is a pigment; and of which another constituent is a material functioning to prevent or inhibit said chemical change of the first mentioned constituent. My invention also includes the process of inhibiting the oxidation in the presence of air of an organic material of the kind first above mentioned, and having present therewith a pigment, by dispersing, at least throughout the surface portion of such material, a material functioning to prevent or inhibit said oxidation.

One important feature of my invention is the retarding of the development of rancidity of oils which tend to become rancid when exposed to air, in those cases where a white pigment is used with the oil, the invention providing for this retardation without deleterious effect on the pigment, or the introduction of other objectionable features. One of the chief objects of my invention, from the aspect just indicated, is to improve upon white or light colored nitrocellulose "dope" compositions for use in coating of fabrics, paper, split leathers, and in general for leather substitute uses.

It has been customary to use vegetable oils as softeners for pyroxylin compositions; castor oil is very generally used in the surface film of artificial leather; and either castor oil or blown rapeseed oil is used in most of the dope applied to split leather. It is noteworthy that the oils used for this purpose belong for the most part in the class of unsaturated glycerides. It is well known that unsaturated fatty oils, as, for example, castor oil, upon exposure to air, develop a rancid odor which is quite objectionable. This rancidity development is especially marked where the oil is a constituent of a coating composition for, in this case, because of the extensive exposed surface, the action of oxygen on the oil is facilitated. The addition of various substances to oils for the purpose of preventing rancidity therein was proposed many years ago. The present invention relates to a particular phase of this general problem of preventing oxidation and rancidity, to wit, prevention in a composition comprising a white or light colored pigment.

For compositions having no pigment, or a dark pigment, the problem of preventing the oxidation and rancidity of the oil may be approached without having to lay particular stress on what discoloring effect a proposed preservative might have on the pigment; for compositions having a white or light colored pigment the problem is difficult. Various preventives of oxidation of oils, called anti-oxidants, have been tried, but they had various objectionable features. Some, for example beta-naphthol, cause yellowing after the product is exposed to light; some cause initial discoloration, which is too much for correction by pigment; some cause a setting of the pigmented pyroxylin jelly; some cause the evolution of organic sulphide fumes sufficient to produce an objectionable odor, as when tartaric acid is used with lithopone white pigment; some cause the preservative to be ineffective as is the case when using citric acid with zinc oxide; the use of tartaric acid with zinc oxide is not entirely satisfactory; zinc oxide is an accelerator of oxidation of the oil; and so on.

Now, according to my invention, I use a white pigment which is less accelerative, that is, is less active in promoting oxidation of the oil, than is zinc oxide; and with this less accelerative pigment I use an hydroxypoly basic acid which will not cause evolution of fumes sufficient to produce an objectionable odor. I have found particularly desirable lithopone and citric acid in combination. Not only is lithopone less accelerative than is zinc oxide, and therefore, satisfactory from that viewpoint, but also it, as distinguished from zinc oxide, does not cause the citric acid to be ineffective—the acid, despite the lithopone, exerts a strong preservative influence on the oil. Also, by using citric acid with lithopone, the production of objectionable odors, produced by the combination, tartaric acid and lithopone, is avoided. Again, there is no causing of a setting of the pigmented jelly. The addition of even a small quantity of citric acid, as one per cent of the weight of the oil, effects a marked decrease in the rate of rancidity development under conditions which are normally favorable to such a change.

The above discovery is particularly useful in preserving the freshness of the oil in white or light colored coating compositions where, for example, nitrocellulose, an oil, generally castor oil, pigment and rancidity retarder are incorporated by a suitable volatile solvent and spread on a cloth backing. The previous conditions militating against the addition of a rancidity retarder to coating compositions containing white or light colored pigment having been overcome, fabrics coated with a composition containing such a pigment may be produced in which the deterioration of the coating composition is guarded against, and the retention of the original pliability of the film ensured.

As a specific example of working in accordance with the invention, but not as a limitation, I give the following: Prepare a coating jelly as follows: Dissolve twelve pounds of pyroxylin in eighty-eight pounds of a mixture of equal parts of ethyl alcohol and ethyl acetate and then add twelve pounds of castor oil, thirty pounds of a mixture of lithopone ground with castor oil in the proportion of two parts of pigment, one part of oil and .44 pound of dry citric acid, i. e. two per cent based on the total oil. This jelly is applied to white cloth in any of the various ways commonly known to the fabric coating art for the production of artificial leather. The proportions of pyroxylin and solvent may, of course, be varied considerably depending on the character of the nitrocellulose, it being customary to use between eight and twenty pounds of pyroxylin for one hundred pounds of solution. The relation of the oil to the pyroxylin depends on the pliability desired, the example given giving a very pliable film. It is desirable to base the amount of preservative upon the amount of total oil because that is the component affected by the preservative; preferably the citric acid is from 1 to 5 per cent based on the total oil.

While I have made specific reference to citric acid it is to be understood that the invention includes the use of esters of citric acid and such salts as are soluble in the solvent mixture. For convenience in claiming I have referred to "compound containing the citric acid radical", meaning by "citric acid radical"

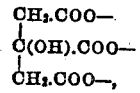

and including compounds in which one or more of the hydrogen atoms of the COOH groups has been replaced to form a salt or ester. Also while I have more particularly mentioned citric acid, it is to be understood that other acids fulfilling the desired objects of the invention, as malic may be used. Also other pigments than lithopone, less accelerative than zinc oxide, as titanium oxide, may be used.

I claim:

1. A coating composition comprising a cellulose compound, a fatty oil having a tendency to become rancid, a pigment of the group composed of lithopone and titanium oxide, and a compound containing the radical of an acid of the group composed of citric and malic acids.

2. A coating composition comprising nitrocellulose, a fatty oil having a tendency to become rancid, a pigment of the group composed of lithopone and titanium oxide, and a compound containing the radical of an acid of the group composed of citric and malic acids.

3. A coating composition comprising nitrocellulose, a fatty oil having a tendency to become rancid, a pigment of the group composed of lithopone and titanium oxide, and an acid of the group composed of citric and malic acids.

4. A coating composition comprising nitrocellulose, a fatty oil having a tendency to become rancid, lithopone, and a compound containing the radical of an acid of the group composed of citric and malic acids.

5. A coating composition comprising nitrocellulose, castor oil, lithopone, and an acid of the group composed of citric and malic acids.

6. A coating composition comprising nitrocellulose, castor oil, lithopone, and citric acid between about 1 to 5 per cent by weight, based upon the amount of said oil.

7. A coating composition comprising nitrocellulose, a fatty oil having a tendency to become rancid, titanium oxide, and a compound containing the radical of an acid of the group composed of citric and malic acids.

8. A coating composition comprising nitrocellulose, castor oil, titanium oxide, and an acid of the group composed of citric and malic acids.

9. A coating composition comprising nitrocellulose, castor oil, titanium oxide, and citric acid between about 1 to 5 per cent by weight, based upon the amount of said oil.

10. Process of retarding the development of rancidity in a light colored pigmented nitrocellulose film containing a fatty oil having a tendency to become rancid and a white pigment which comprises using as the white pigment in the composition from which the film is formed, a pigment selected from the group composed of lithopone and titanium oxide, and adding to the composition as rancidity retardant for the oil a compound containing the radical of an acid of the group composed of citric and malic acids.

In testimony whereof I affix my signature.

JOHN C. EMHARDT.